Figure 1:
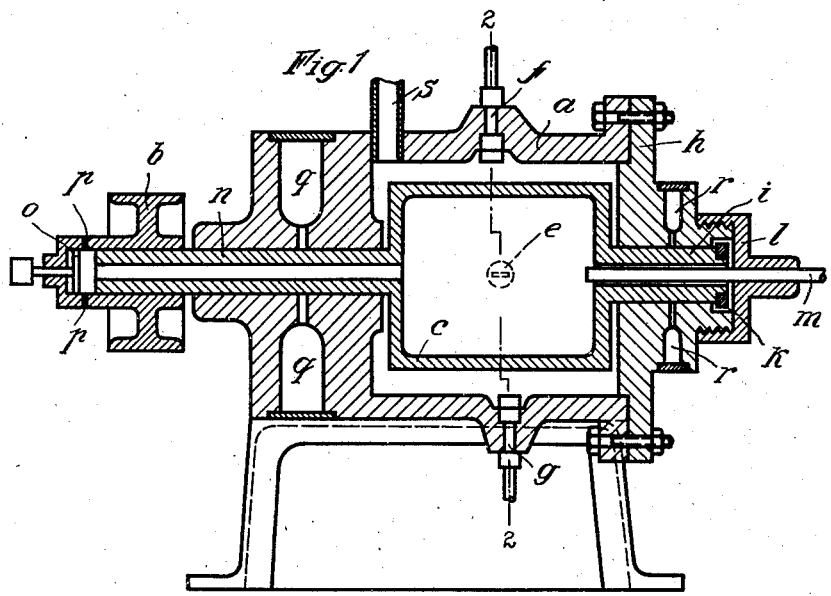

Dec. 9, 1930.  M. POLANYI ET AL  1,784,611
METHOD OF PRODUCING BODIES CONSISTING OF A PLURALITY OF
THIN ALTERNATELY CONDUCTING AND INSULATING LAYERS
Filed July 6, 1928

Inventors
Michael Polanyi, +
Stephan von Bogdandy
by Knight Bros
Attorney

Patented Dec. 9, 1930

1,784,611

UNITED STATES PATENT OFFICE

MICHAEL POLANYI, OF BERLIN-ZEHLENDORF-MITTE, AND STEPHAN von BOGDANDY, OF BERLIN-DAHLEM, GERMANY METHOD OF PRODUCING BODIES CONSISTING OF A PLURALITY OF THIN ALTERNATELY CONDUCTING AND INSULATING LAYERS Application filed July 6, 1928, Serial No. 290,868, and in Germany July 7, 1927.

Our invention relates to an improved method of producing bodies consisting of a plurality of thin alternately conducting and insulating layers, and which are particularly suitable to be used as electric condensers. The most up-to-date researches have shown that the dielectric or disruptive strength of thin layers or films rises beyond the ordinary value of $3 \times 10^5$ volts per cm., when the thickness is less than 0.005 mm., and that it rises the higher the thinner the layer. It has been ascertained, that by a sufficient reduction of the thickness of the layers a dielectric strength of $1.5 \times 10^8$ volts per cm. may be attained, that is 500 times the ordinary hitherto attainable value. A body composed of a plurality of alternately metallic and insulating layers would thus at a thickness of the individual layers of less than 0.005 mm. represent an electric condenser, which in spite of its very small volume has a higher capacitance than any other known electric condenser of equal size.

The practical utilization of the result of these investigations would encounter extraordinary difficulties at the present state of the art. The most obvious mode to compose the condenser of individually manufactured metal foils or plates and insulating layers in alternate sequence, for instance by pressing, would be extremely difficult and expensive.

Our invention enables such electric condensers to be constructed in a very simple manner and in a single continuous operation.

Our improved method consists in condensing or spraying the metallic and the dielectric substances in vaporous or liquid state, preferably in an evacuated chamber, in quick succession on a common, preferably cooled surface. The thickness of the individual layers is regulated by the number of alternations taking place in the unit of time and the quantity of the substances to be piled up issuing from the nozzles in the unit of time.

The alternate application of the conducting and the dielectric substances upon a common surface is according to our invention attained by displacing the supply of the substances in the direction of motion of the surface to which they are applied, for instance by supplying the materials through spaced nozzles and spraying them on to a surface moving at a high speed upon which they are condensed. This may be, for instance the surface of a quickly revolving drum, the number of alternations in the kind of material supplied taking place in the unit of time being determined by the speed of the surface, for instance the number of revolutions of the drum or cylinder. The metallic connection of the metal layers of like polarity necessary in electric condensers is, according to our invention, attained by providing for each of the substances to be applied at least two outlet nozzles in alternate sequence in the direction of the surface motion and displacing the metal spray nozzles transversely to the direction of motion of the surface in such a manner in relation to one another, that the applied layers of metal project beyond the intermediate dielectric layers alternately at the one and at the other edge and rest directly upon one another.

A machine for carrying out our improved method and an electric condenser produced by this machine are by way of example illustrated in the drawing affixed hereto and forming part of our specification.

Figure 2:
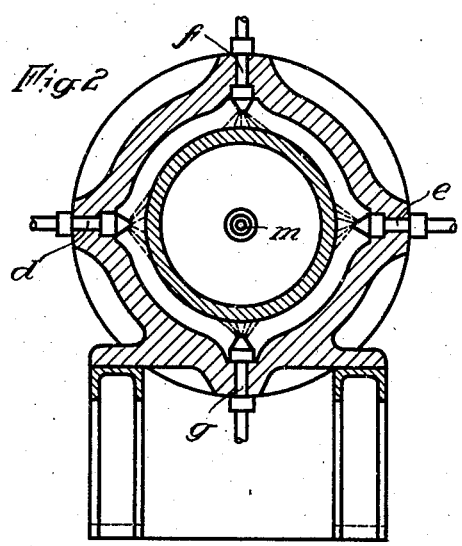

In the drawing:

Fig. 1, represents the machine in longitudinal vertical section,

Fig. 2, a transverse-section through the machine along line 2—2 of Fig. 1, and

Figure 3:

Fig. 3, an electric condenser produced by the machine in cross-section, in diagrammatic representation.

Referring to Figs. 1 and 2 of the drawing, $c$ is a drum rotated at a high speed within the housing $a$ by means of a pulley $b$. The surface of the drum $c$ moves in front of the nozzles $d, e, f, g$, two of which, for instance $d$ and $e$, apply the dielectric substance and two, for instance $f$ and $g$, the metallic substance to the drum. The housing $a$ is closed at one end by a detachable cover $h$ in which is supported the journal $i$ of the drum $c$. A collar $k$ mounted upon the journal $i$ revolves with a small amount of play in an annular chamber formed between the nut $l$ and the cover $h$, so as to prevent axial displacement of the drum. Through the hollow journal $i$ is introduced a pipe $m$ with a certain amount of play. The pipe $m$ is maintained in its central position by the nut $l$. Through this pipe is introduced a cooling medium, for instance the vapors of liquid air, into the interior of the drum $c$. The discharge of the cooling medium takes place through the likewise hollow shaft $n$ of the drum $c$ upon which is keyed the driving pulley $b$.

In the end of the hub of the pulley $b$ projecting beyond the end of the shaft $n$ is housed a slide valve $o$ by means of which the area of the outlet openings $p$ for the cooling medium and thus the quantity of the cooling medium flowing through the drum in the unit of time may be controlled. The hollow journals or shafts $i$ and $n$ are lubricated from oil cups $q$ and $r$. The housing $a$ is continuously evacuated by means of a pipe $s$. The mouths of the nozzles $d$, $e$, $f$, $g$ are preferably rectangular. The metal supply nozzles are displaced in the direction of the drum axis relatively to one another in such a manner, that the axis of one metal nozzle $f$ is located on one side and the axis of the nozzle $g$ on the other side of the transverse plane passing through the diametrically opposite nozzles $d$ and $e$ for the dielectric. By this displaced arrangement of the metal supply nozzles the result is obtained, that the layers of metal $t$ applied by one metal nozzle, for instance $f$, project beyond the dielectric layers $u$ applied by the nozzles $d$ and $e$ at their left-hand edges and are metallically connected with one another, while the metal layers $v$ applied by the other metal nozzles, for instance $g$, project beyond the dielectric layers $u$ at their right-hand side edges and are likewise directly superposed. The thickness of the individual layers depends upon the speed of the drum and the quantity of the substances to be piled up issuing in the unit of time from the nozzles. After the desired number of layers has been applied to the drum, the drum is arrested, the cover $h$ detached and the drum $c$ after removal of the driving pulley $b$ withdrawn from the housing $a$. The spiral layers are then severed in an axial direction and peeled off the drum.

As materials for the method described in the foregoing may be used dielectrics which can be melted and vaporized and metals which can be melted and vaporized at reasonable temperatures, provided that these materials can be liquefied respectively vaporized without being decomposed thereby. This would naturally leave to the one skilled in the art a wide range within which to pick the materials suitable for the particular work on hand. As insulating materials may be mentioned for instance paraffine, potassium-fluoride, and sulphur, without thereby limiting the number of insulating materials which can be used. For instance, paraffine can be comparatively easily melted and vaporized. If it is to be condensed from its vapour form as a thin layer, care should be taken that this occurs at sufficiently low pressure, for which provisions are made in the apparatus described hereinbefore, so that the paraffine will not decompose. The temperature suitable for paraffine would be about 360° C. If the insulating layers are to be made by condensing potassium-fluoride essentially higher temperatures must be used, approximately 1500° C.

For producing the metal layers, metals are particularly suitable which can be easily vaporized, such as magnesium or zinc. However, even tungsten can be used when the vaporization is carried out at a sufficiently high vacuum.

It is outside the scope of the present invention to describe or mention the different kinds of furnaces which must be employed for the different kinds of material. Those skilled in the art are sufficiently acquainted with the devices and contrivances for melting the suitable materials at the proper temperatures. After the operator or the engineer has decided what materials to use or producing, for instance a condenser according to the present invention, all that is required of him is to look up the melting or vaporization temperatures of the particular materials, and to choose from the art a suitable furnace in which to heat them to the proper temperature.

Since, according to the method described, the materials are sprayed onto the drum or condensed thereon from their vaporous state, the materials will harden very quickly. By using effective cooling methods and materials such as have been described hereinbefore, each layer can be hardened and cooled before the next layer is applied to it, provided also the proper speed of the drum is employed which would naturally also vary with the kinds of material used.

The cooling occurs in such comparatively short time also for the reason that the thickness of the layer deposited upon the drum is so small that the heat contained in the material at the moment when it is deposited can easily be dissipated within 1/40 to 1/100 of a second, for instance by using liquid air in the drum $c$ as described hereinbefore. If the materials are sprayed onto the drum in liquid state instead of in a vaporous state, the speed of the drum must naturally be reduced.

It is also quite obvious that the melting temperatures of the two kinds of material used should not lie too far apart. Thus, for instance if paraffine is used as insulating material a metal alloy should be used which has a low melting temperature such as for instance Woods metal. In this manner at a speed of from 100 to 500 revolutions per minute of drum $c$, and for a diameter of the drum of from 50 to 100 millimeters, insulating material and metal of a thickness of respectively .001 to .0002 mm. may be alternately deposited on the drum when liquid air is supplied through the drum, so that the latter assumes the temperature of liquid air, and if a pressure is maintained in the condensation chamber less than 1 millimeter mercury column. After a few minutes operation a cylindrical condenser of suitable thickness, respectively suitable number of layers has been formed and it now can be removed from the cylinder.

Various modifications and changes may be made without departing from the spirit and the scope of the invention, and we desire, therefore, that only such limitations shall be placed thereon as are imposed by the prior art.

We claim as our invention:

1. The method of manufacturing a body suitable as electric condenser and consisting of a plurality of thin, alternately conducting and insulating layers, which consists in precipitating the substances to be superposed in quick succession upon a common support.

2. The method of manufacturing a body suitable as electric condenser and consisting of a plurality of thin, alternately conducting and insulating layers, which consists in condensing the vaporized substances to be superposed in quick succession upon a common cooled support.

3. The method of manufacturing a body suitable as electric condenser and consisting of a plurality of thin, alternately conducting and insulating layers, which consists in condensing the vaporized substances to be superposed in quick succession upon a common foundation located in an evacuated chamber and cooled.

4. The method of manufacturing a body suitable as electric condenser and consisting of a plurality of thin, alternately conducting and insulating layers, which consists in spraying the substances to be superposed upon a common support.

5. The method of manufacturing a body suitable as electric condenser and consisting of a plurality of thin, alternately conducting and insulating layers, which consists in applying one of the substances to be superposed by condensation and the other by spraying to a common support.

6. The method of manufacturing a body suitable as electric condenser and consisting of a plurality of thin, alternately conducting and insulating layers, which consists in precipitating the substances to be superposed from locally displaced points upon a surface moving with a high velocity.

7. The method of manufacturing a body suitable as electric condenser and consisting of a plurality of thin, alternately conducting and insulating layers, which consists in precipitating the substances to be superposed from locally displaced points upon a drum revolving at a high speed.

8. The method of manufacturing a body suitable as electric condenser and consisting of a plurality of thin, alternately conducting and insulating layers, which consists in conducting each of the substances to be superposed through at least two openings against the support, the openings serving for the application of the conducting layer being displaced transversely to the direction of motion of the support in such a way, that the conducting layers alternately project beyond the intermediate dielectric layers at one side or the other and are in contact with one another.

In testimony whereof we affix our signatures.

MICHAEL POLANYI.
STEPHAN von BOGDANDY.